US007992170B2

(12) United States Patent  (10) Patent No.: US 7,992,170 B2
You (45) Date of Patent: Aug. 2, 2011

(54) APPARATUS FOR PROVIDING ELECTRONIC PROGRAM GUIDE INFORMATION IN A DIGITAL MULTIMEDIA BROADCAST RECEIVING TERMINAL AND A METHOD THEREFOR

(75) Inventor: Jeong-Min You, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 502 days.

(21) Appl. No.: 11/703,537

(22) Filed: Feb. 7, 2007

(65) Prior Publication Data

US 2007/0234387 A1 Oct. 4, 2007

(30) Foreign Application Priority Data

Feb. 7, 2006 (KR) .................... 10-2006-0011895

(51) Int. Cl.
*H04N 5/44* (2011.01)
*H04N 5/445* (2011.01)
(52) U.S. Cl. ......................... 725/39; 704/260
(58) Field of Classification Search .............. 725/37–61; 704/260
See application file for complete search history.

(56) References Cited

U.S. PATENT DOCUMENTS

| | | | | |
|---|---|---|---|---|
| 5,737,030 A * | 4/1998 | Hong et al. ...................... 725/41 | | |
| 5,990,927 A | 11/1999 | Hendricks et al. | | |
| 6,118,498 A * | 9/2000 | Reitmeier ..................... 348/725 | | |
| 6,330,537 B1 * | 12/2001 | Davis et al. .................... 704/257 | | |
| 7,072,686 B1 * | 7/2006 | Schrager .................... 455/556.1 | | |
| 7,483,834 B2 * | 1/2009 | Naimpally et al. ........ 704/270.1 | | |
| 2002/0040476 A1 * | 4/2002 | Whitehead ...................... 725/39 | | |
| 2004/0168187 A1 * | 8/2004 | Chang ............................. 725/40 | | |
| 2004/0194137 A1 * | 9/2004 | Shreesha ......................... 725/41 | | |
| 2006/0031904 A1 * | 2/2006 | Groff et al. ................... 725/106 | | |
| 2006/0161425 A1 * | 7/2006 | Lee et al. ...................... 704/201 | | |
| 2006/0166674 A1 * | 7/2006 | Bennett et al. ................ 455/445 | | |

FOREIGN PATENT DOCUMENTS

| | | |
|---|---|---|
| CN | 1723707 | 1/2006 |
| EP | 1 575 252 | 9/2005 |
| KR | 1020000066645 | 11/2000 |
| KR | 1020050028126 | 3/2005 |

* cited by examiner

*Primary Examiner* — Andrew Y Koenig
*Assistant Examiner* — Carmine Malangone
(74) *Attorney, Agent, or Firm* — The Farrell Law Firm, P.C.

(57) ABSTRACT

Disclosed is a method for providing Electronic Program Guide (EPG) information in a digital multimedia broadcast receiving terminal, which includes causing the digital multimedia broadcast receiving terminal to convert the EPG information of a broadcast channel previously stored into corresponding audio data delivered to a headset communicating with the digital multimedia broadcast receiving terminal, and causing the headset to output the audio data received, whereby the user may recognize the channel information by using only the wireless headset, without having to view the terminal.

19 Claims, 4 Drawing Sheets

APPARATUS FOR PROVIDING ELECTRONIC PROGRAM GUIDE INFORMATION IN A DIGITAL MULTIMEDIA BROADCAST RECEIVING TERMINAL AND A METHOD THEREFOR

PRIORITY

This application claims priority under 35 U.S.C. §119 to an application entitled "Apparatus for Providing Electronic Program Guide Information in a Digital Multimedia Broadcast Receiving Terminal and a Method therefor" filed in the Korean Intellectual Property Office on Feb. 7, 2006 and assigned Serial No. 2006-11895, the contents of which are incorporated herein by reference.

BACKGROUND OF THE INVENTION

1. Field of the Invention

The present invention relates generally to a digital multimedia broadcast receiving terminal, and more particularly to an apparatus for providing Electronic Program Guide (EPG) information in a digital multimedia broadcast receiving terminal and a method therefor.

2. Description of the Related Art

Wireless Local Area Network (LAN) communications such as Bluetooth® has had numerous applications for providing inexpensive wireless communications in a small area. For example, the wireless LAN communications enables wireless communication between various devices such as a computer, monitor, printer and keyboard. Additional devices such as a Personal Digital Assistant (PDA), facsimile, digital multimedia broadcast terminal and wireless headset may be interconnected through the wireless LAN.

When a digital multimedia broadcast receiving terminal and a headset are provided with a wireless LAN module, the user can carry the headset without any cables to enjoy broadcast sound. Hence, if the digital multimedia broadcast receiving terminal and headset are present within the wireless communication service range of the wireless LAN module, the user can hear all broadcast sounds through the headset. However, in this case the user can enjoy only the audio signals from the digital multimedia broadcast signals, and therefore cannot perceive the channel information presented in the display of the digital multimedia broadcast receiving terminal. For example, when the digital multimedia broadcast channel is changed, the user can recognize neither the channel information such as the EPG information of the presently broadcast channel nor the other channels' information, which can be uncomfortable for the user. This is a common problem to both the wireless and wired headsets.

SUMMARY OF THE INVENTION

It is an object of the present invention to provide an apparatus for enabling the user to readily perceive the EPG information of a digital multimedia broadcast channel through a headset communicating with a digital multimedia broadcast receiving terminal, and a method therefor.

It is another object of the present invention to provide an apparatus for enabling a digital multimedia broadcast receiving terminal to provide the EPG information of a digital multimedia broadcast channel through a headset, and a method therefor.

According to the present invention, the apparatus includes a wireless headset for outputting received audio data, and a digital multimedia broadcast receiving terminal for converting previously stored EPG information into corresponding audio data delivered through wireless LAN communications to the headset.

According to the present invention, an apparatus for providing the EPG information in a digital multimedia broadcast receiving terminal includes a memory for storing the EPG information of a broadcast channel received from a digital multimedia broadcast system, and a digital multimedia broadcast processor for converting the EPG information retrieved from the memory into corresponding EPG audio data delivered to a headset communicating with the digital multimedia broadcast receiving terminal.

According to the present invention, a method for providing the EPG information in a digital multimedia broadcast receiving terminal includes causing the digital multimedia broadcast receiving terminal to convert the EPG information of a broadcast channel previously stored into corresponding audio data delivered to a headset communicating with the digital multimedia broadcast receiving terminal, and causing the headset to output the audio data received.

According to the present invention, an apparatus for providing the EPG information in a digital multimedia broadcast receiving terminal includes a memory for storing the EPG information of a broadcast channel received from a digital multimedia broadcast system, a Text to Speech (TTS) module for converting the data input into corresponding audio data output, and a digital multimedia broadcast processor for causing the TTS module to convert the EPG information retrieved from the memory into corresponding EPG audio data delivered to a headset communicating with the digital multimedia broadcast receiving terminal.

BRIEF DESCRIPTION OF THE DRAWINGS

The above and other objects, features and advantages of the present invention will become more apparent from the following detailed description when taken in conjunction with the accompanying drawing in which.

DETAILED DESCRIPTION OF THE PREFERRED EMBODIMENTS

Figure 1:
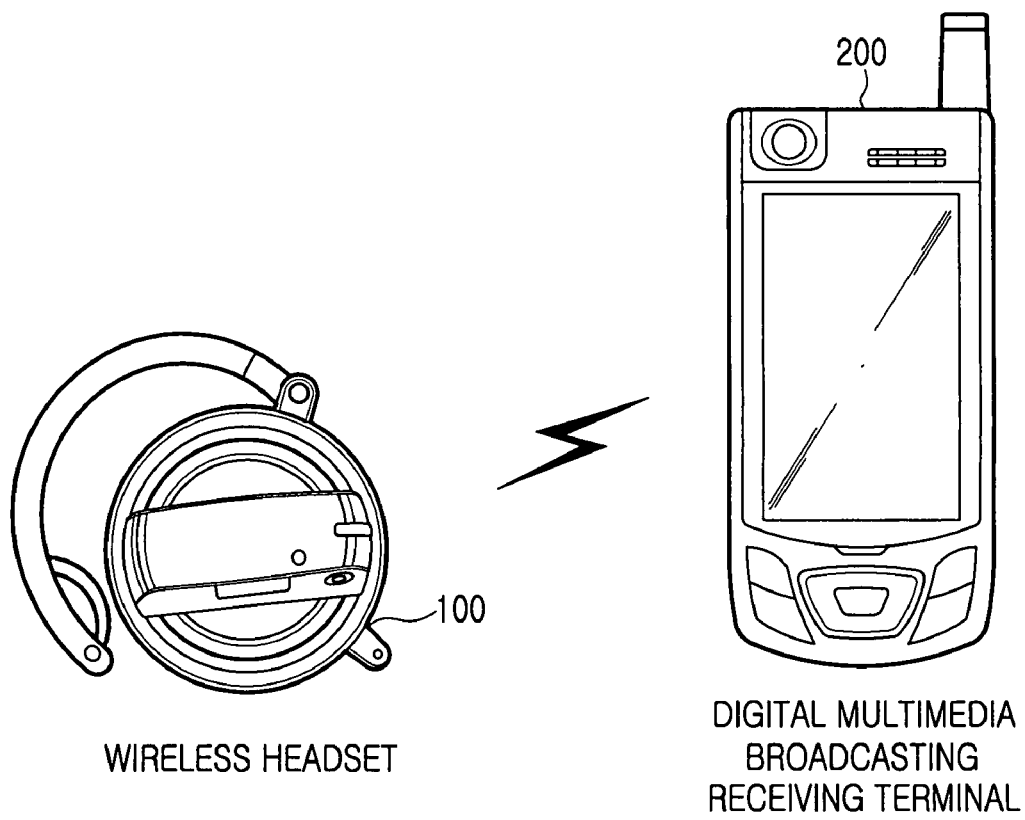
FIG. 1 illustrates a wireless headset communicating with a digital multimedia broadcast receiving terminal according to the present invention.

Preferred embodiments of the present invention will be described herein below with reference to the accompanying drawings. In the drawings, the same or similar elements are denoted by the same reference numerals even though they are depicted in different drawings. In the following description, well-known functions or constructions are not described in detail for the sake of clarity and conciseness.

FIG. 1 illustrates a digital multimedia broadcast receiving terminal 200 associated with a wireless headset 100 according to the present invention. The digital multimedia broadcast receiving terminal 200 demodulates the digital multimedia broadcast signals received from a digital multimedia broadcast system so as to enable the user to enjoy the digital multimedia broadcast contents. The terminal 200 may be a type for exclusively receiving digital multimedia broadcast signals, or a composite digital multimedia broadcast receiving terminal also serving as a mobile communications terminal. Hereinafter, the invention is described in connection with the composite digital multimedia broadcast receiving terminal. The digital multimedia broadcast receiving terminal 200 delivers the audio data received from digital multimedia broadcast or mobile communication through a wireless LAN communications to the wireless headset 100. In addition, the terminal 200 performs the operations corresponding with the key input data received from the wireless headset 100, and also processes the audio data received.

The wireless headset 100 outputs the audio signals received through the wireless LAN communications from the digital multimedia broadcasting receiving terminal 200. The wireless headset 100 also includes a plurality of input keys used for generating the key input data to control the terminal 200 through the wireless LAN communications. In addition, the headset 100 includes a microphone for transmitting the user's voice signals through the wireless LAN communications to the digital multimedia broadcasting receiving terminal 200.

Figure 2:
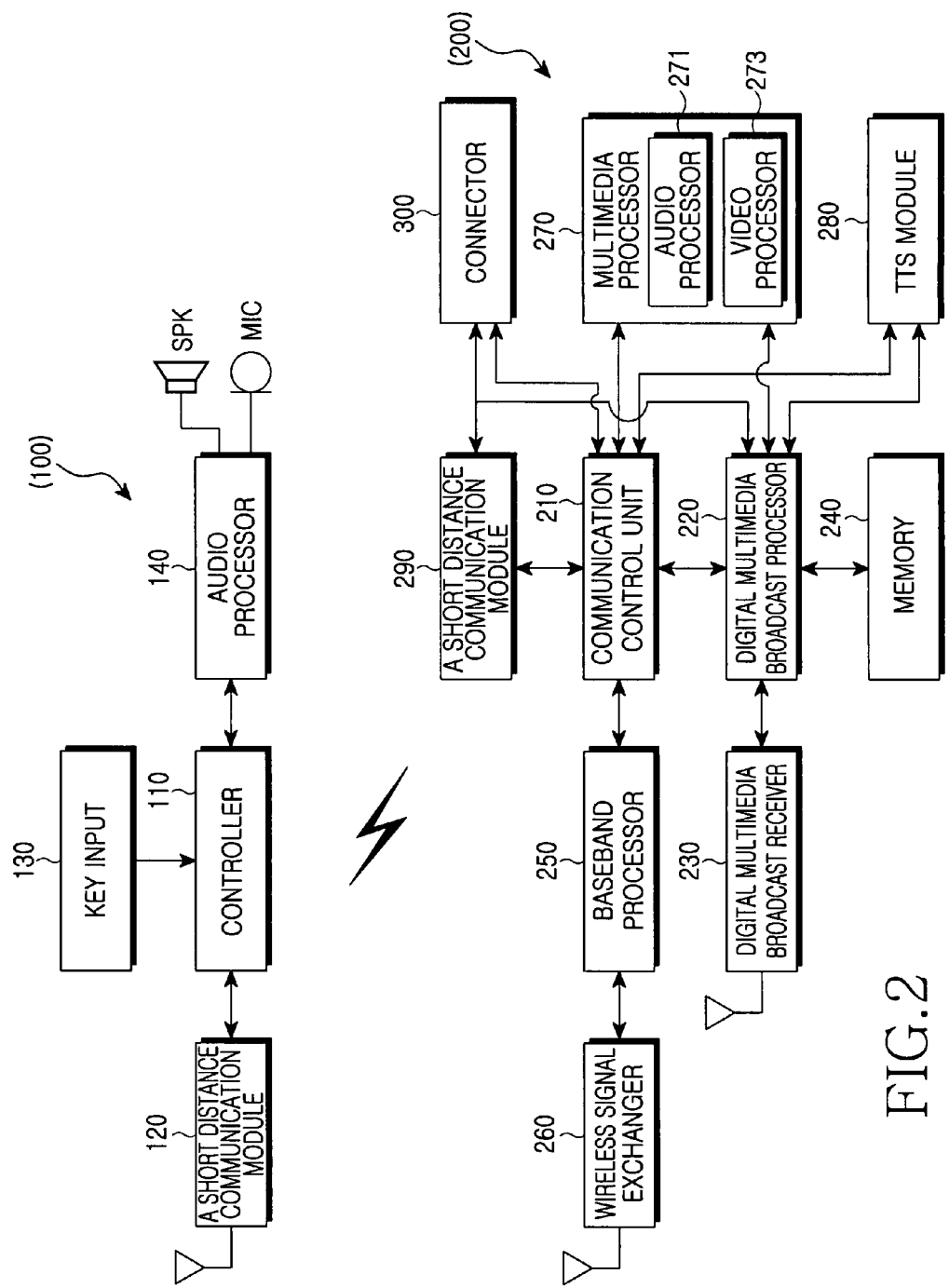
FIG. 2 illustrates the structure of a digital multimedia broadcast receiving terminal associated with a wireless headset according to the present invention.

With reference to FIG. 2 is described the structure of the digital multimedia broadcasting receiving terminal 200 associated with the wireless headset 100. The wireless headset 100 includes a controller 110, wireless LAN module 120, key input (130) and audio processor 140. The controller 110 controls the overall function of the wireless headset 100. The wireless LAN module 120 exchanges data with the wireless LAN module 290 of the digital multimedia broadcasting receiving terminal 200 under the control of the controller 110. The audio processor 140 processes the audio data received through the wireless LAN module 120 delivered to the speaker (SPK), and converts the audio signals input through the microphone (MIC) into corresponding digital signals delivered through the wireless LAN module 120 to the terminal 200, under the control of the controller 110. The key input part 130 includes a plurality of input keys to enable the user to generate key input data delivered through the wireless LAN module 120 to the terminal 200 under the control of the controller.

The digital multimedia broadcasting receiving terminal 200 includes a communication control unit 210, digital multimedia broadcast processor 220, digital multimedia broadcast receiver 230, memory 240, baseband processor 250, wireless signal exchanger 260, multimedia processor 270, TTS module 280, wireless LAN module 290 and connector 300.

The digital multimedia broadcast receiver 230 is controlled by the digital multimedia broadcast processor 220 to receive digital multimedia broadcast signals.

The wireless signal exchanger 260 exchanges radio signals with a mobile communications base station through the antenna by modulating the signals received from the communication control unit 210 through the baseband processor 250 and demodulating the signals received through the antenna delivered through the baseband processor 250 to the communication control unit 210. The baseband processor 250 processes the baseband signals exchanged between the wireless signal exchanger 260 and the communication control unit 210.

The multimedia processor 270 includes an audio processor 271 and a video processor 273. The audio processor 271 processes the audio signals input through a microphone delivered to the communication control unit 210, and the audio data received from the communication control unit 210 and the digital multimedia broadcast processor 220 delivered to a plurality of audio output devices such as a speaker and an earphone. The video processor 273 processes the image data received from the digital multimedia broadcast processor 220 to display the images under the control of the communication control unit 210.

The memory 240 stores the programs for controlling the operation of the digital multimedia broadcast processor 220 and various data such as reference data and other revisable necessary data, and as a working memory of the multimedia broadcast processor 220. In addition, the memory 240 stores the EPG information received from the digital multimedia broadcast system.

The wireless LAN module 290 such as a Bluetooth® module exchanges data with the wireless LAN module 120 of the wireless headset 100 under the control of the communication control unit 210 or the multimedia broadcast processor 220. To this end, the wireless LAN module 290 formats the data to be transmitted so as to fit wireless LAN communications and recovers the data received from outside.

The connector 300 is associated with the jack plug of a wired headset so that the wired headset may receive the audio data from the terminal 200 under the control of the communication control unit 210 or the multimedia broadcast processor 220 and send the audio data input through its microphone or the key input data to the communication control unit 210.

The communication control unit 210 controls the operation of the digital multimedia broadcast receiving terminal 200 for performing the mobile communication. When the headset mode is set, the communication control unit 210 controls the terminal 200 to output the audio data generated by the mobile communication through the wireless LAN module 290 or the connector 300. In addition, the communication control unit 210 delivers the audio data received from the headset through the wireless LAN module 290 or the connector 300 to the audio processor 271, and controls the terminal 200 according to the key input data. When both the digital multimedia broadcast mode and the headset mode are set, the communication control unit 210 also controls the TTS module 280 to convert the phone number of a person who calls the user into the corresponding audio data delivered to the wireless LAN module 290.

The digital multimedia broadcast processor 220 decodes the digital multimedia broadcast signals received from the digital multimedia broadcast receiver 230 to extract video data and audio data respectively delivered to the video processor 273 and the audio processor 271 according to the key input data received from the communication control unit 210. If the headset mode is set, the digital multimedia broadcast processor 220 delivers the digital multimedia broadcast audio data to the wireless LAN module 290 and connector 300. In addition, the digital multimedia broadcast processor 220 controls the digital multimedia broadcast receiving terminal 200 according to the key input data received through the wireless LAN module 290 or connector 300. The headset mode of the digital multimedia broadcast receiving terminal 200 is associated with the wireless or wired headset 100 through their respective wireless LAN module or the connector 300, so that the digital multimedia broadcast receiving terminal 200 may deliver the audio signal to the wireless or wired headset 100.

In the headset mode, if the user requests the EPG information of the channel presently set or all channels, or makes a channel change, the digital multimedia broadcast processor 220 retrieves the EPG information from the memory 40 delivered to the TTS module 280, which converts the text data such as EPG information and a phone number into corresponding audio data under the control of the communication control unit 210 or the digital multimedia broadcast processor 220.

Figure 3A:
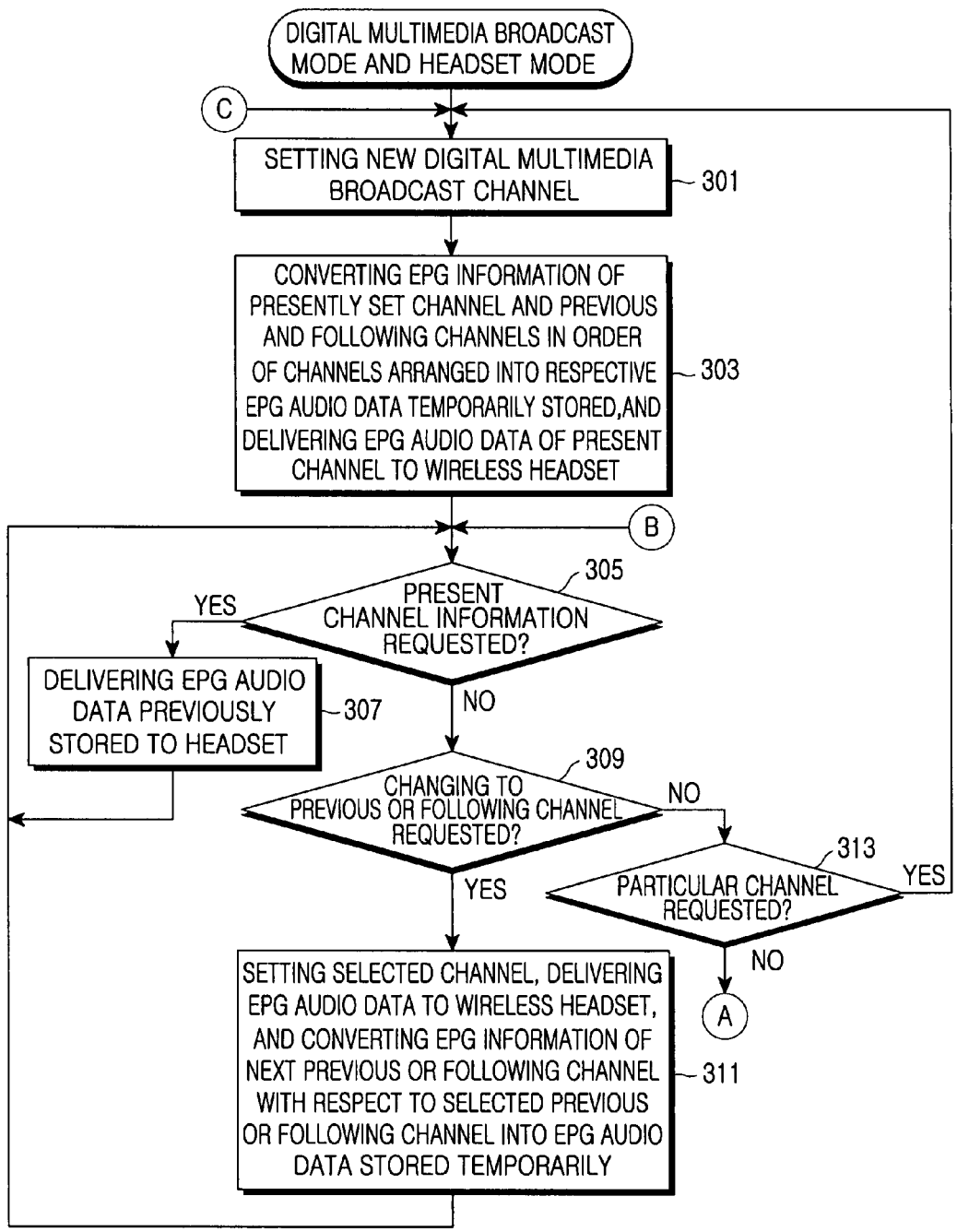
FIGS. 3A and 3B show a flowchart for illustrating the process of providing the EPG information in a digital multimedia broadcast receiving terminal according to the present invention.
Figure 3B:
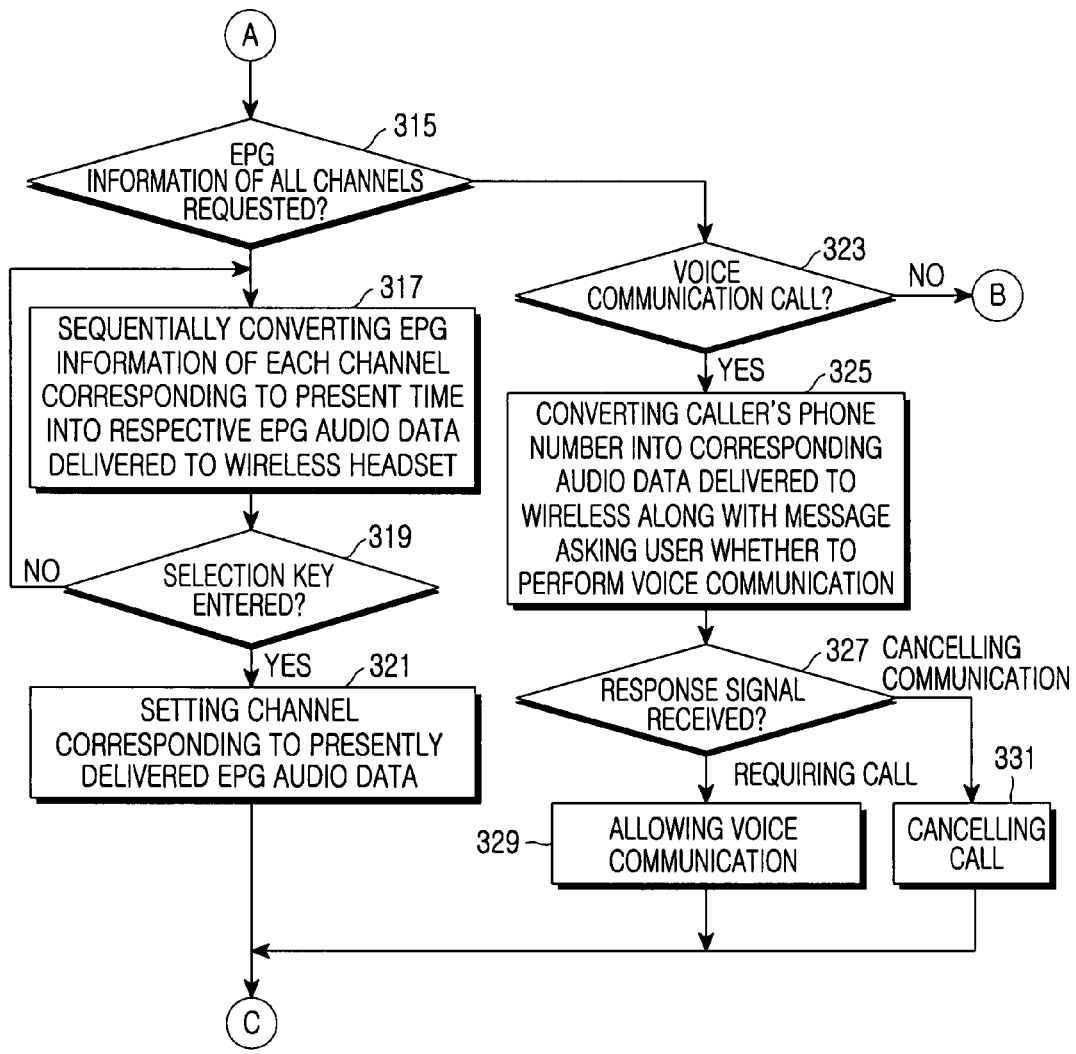

FIGS. 3A and 3B show a flowchart for illustrating the process of providing the EPG information in a digital multimedia broadcast receiving terminal according to the present invention. For convenience's sake, the description is made in connection with the wireless headset 100 associated with the terminal 200. A similar operation is performed in connection with a wired headset associated with the terminal 200.

Referring to FIG. 3A, if a new digital multimedia broadcast channel is set in step 301 in the digital multimedia broadcast mode and headset mode, the digital multimedia broadcast receiving terminal 200 proceeds to step 303. The channel may be newly set as the user changes a channel or starts to enjoy the digital multimedia broadcast. In step 303, the digital multimedia broadcast receiving terminal 200 converts the EPG information of the presently set channel and the previous and following channels in the order of the channels arranged into their respective EPG audio data temporarily stored, delivering the EPG audio data of the present channel to the wireless headset 100. The wireless headset 100 outputs the EPG audio data through the speaker (SPK). The EPG information is the channel information received from the digital multimedia broadcast system, representing the brief program information broadcast through respective channels according to time. In the step 303, the digital multimedia broadcast processor 220 of the digital multimedia broadcast receiving terminal 200 retrieves the EPG information of the present channel from the memory 240 delivered to the TTS module 280. In this case, the digital multimedia broadcast processor 220 retrieves the EPG information of the previous and the following channels with respect to the present channel in the order of the stored channels. The order of the aligned channels may be the order of the channel numbers or frequencies or set by the user. The TTS module 280 converts the EPG information into corresponding audio data. The digital multimedia broadcast processor 220 temporarily stores the converted EPG information, i.e., the EPG audio data of the present, previous and following channels into the memory 240, delivering the EPG audio data of the present channel to the wireless headset 100. Namely, the EPG information of the newly set channel is provided through the wireless headset 100 to the user.

If the user requests the information of the present channel in step 305, the terminal 200 proceeds to step 307 to deliver the EPG audio data temporarily stored in the step 303 through the wireless LAN communications to the wireless headset 100, returning to the step 305. The wireless headset 100 outputs the EPG audio data through the speaker (SPK). The request for the EPG information of the present channel may be entered into the digital multimedia broadcast receiving terminal 200 by a key input part provided in the terminal 200 or by the wireless headset 100 through the wireless LAN communications.

Thereafter, if there is a request to change to the previous or following channel in step 309, the digital multimedia broadcast receiving terminal 200 proceeds to step 311. The channel changing request may be made by the scroll key selecting the previous or following channel with respect to the present channel. In step 311, the digital multimedia broadcast receiving terminal 200 sets the selected channel, and then delivers its EPG audio data stored in step 303 to the wireless headset 100, and converts the EPG information of the next previous or following channel with respect to the selected previous or following channel in the order of the channel alignment into corresponding EPG audio data stored temporarily, then returning to the step 305. The wireless headset 100 outputs the received EPG audio data through the speaker (SPK). More specifically, if there is in step 309 a request to change to the previous channel with respect to the presently set channel, the digital multimedia broadcast processor 220 sets the previous channel in step 311, and then delivers its EPG audio data previously stored through the wireless LAN module 290 to the wireless headset 100, while retrieving and converting the EPG information of the next previous channel with respect to the selected previous channel in the order of the channel alignment into corresponding EPG audio data temporarily stored. Thus, even if there are successive requests to change to the previous channels, the EPG audio data may be provided to the user in real time with the new channel setting. A similar procedure applies to the selection of the following channel in step 309.

Meanwhile, if the user makes a request to change to a particular channel in step 313, the digital multimedia broadcast receiving terminal 200 returns to step 301 to set the particular channel as the new digital multimedia broadcast channel, proceeding to step 303 to perform the foregoing procedures therein.

Referring to FIG. 3B, if the user requests the EPG data of all channels in step 315, the digital multimedia broadcast receiving terminal 200 proceeds to step 317 to sequentially convert the EPG information of all channels corresponding to the present time into the respective EPG audio data delivered to the wireless headset 100. The wireless headset 100 outputs the received EPG audio data through the speaker (SPK). More specifically, the digital multimedia broadcast processor 220 retrieves from the memory 240 the EPG information of each channel corresponding to the present time delivered to the TTS module 280 to generate the EPG audio data. In this case, the digital multimedia broadcast processor 220 converts the EPG information of each channel into corresponding EPG audio data while delivering the EPG audio data of the channel just previously converted to the wireless headset 100, thus providing the EPG information of all the channels converted into the respective EPG audio data in real time. If the user enters the selection key in step 319, the terminal 200 proceeds to step 321 to set the channel corresponding to the presently delivered EPG audio data with stopping further generation of the EPG audio data, then returning through bypass C to step 301 as shown in FIG. 3A. Thus the user can obtain the EPG information of all the channels through the wireless headset 100. The request for the EPG information of all the channels may be entered through the terminal 200 or headset 100. If the user enters the selection key while hearing the EPG audio data of a channel, the digital multimedia broadcast receiving terminal 200 sets the terminal. The selection key may also be entered through the wireless headset or the terminal 200.

When receiving a voice communication call in the digital multimedia broadcast and the headset modes, the terminal 200 performs steps 323 to 331 as shown in FIG. 3B so as to convert the phone number of the caller into corresponding audio data delivered through the wireless LAN communications to the wireless terminal. Namely, receiving the voice communication call in step 323 as shown in FIG. 3B, the communication control unit 210 proceeds to step 325 to convert the detected caller's phone number into the corresponding audio data, which is delivered through the wireless LAN communications to the wireless headset 100 along with a message (e.g., 000-000-0000 is calling. Enter communication key to allow, or cancel key to cancel) asking the user whether to perform the voice communication. Then the wireless headset 100 delivers a response signal to the terminal 200. According to the response signal in step 327, the terminal proceeds to step 329 to allow voice communication, or to step 331 to cancel the call. The digital multimedia broadcast receiving terminal 200 may also deliver the name of the caller corresponding to the calling phone number to the wireless headset 100.

As described above, the present invention enables the digital multimedia broadcast receiving terminal 200 to convert the EPG information into corresponding EPG audio data delivered to the wireless headset 100, so that the user may recognize the channel information by using only the wireless headset 100, without having to view the terminal. Although the present embodiment provides the digital multimedia broadcast receiving terminal 200 with the TTS module 280 to convert the EPG information into the corresponding EPG audio data, another embodiment may enable the digital multimedia broadcast processor 220 to convert the EPG information into the corresponding EPG audio data.

While the invention has been shown and described with reference to a certain preferred embodiment thereof, it will be understood by those skilled in the art that various changes in form and details may be made therein without departing from the spirit and scope of the invention.

What is claimed is:

1. An apparatus for providing Electronic Program Guide (EPG) information in a digital multimedia broadcast receiving terminal, comprising:
   a memory for storing the EPG information of a broadcast channel received from a digital multimedia broadcast system; and
   a digital multimedia broadcast processor for converting select EPG information retrieved from the memory into corresponding EPG audio data for delivery to a headset communicating with the digital multimedia broadcast receiving terminal;
   wherein, when a new broadcast channel is set, the digital multimedia broadcast processor converts only EPG information of the new broadcast channel, a previous channel, and a following channel retrieved from the memory into corresponding EPG audio data, delivers EPG audio data of the new broadcast channel to a headset, and stores EPG audio data of the previous and the following channels in the memory for delivery to the headset when the previous or the following channel is set as the new broadcast channel, and wherein the previous and the following channels are determined with respect to the new channel in an order of previously stored channels.

2. An apparatus as defined in claim 1, wherein when there is a request for changing to said following channel, said digital multimedia broadcast processor delivers the EPG audio data of said following channel to said headset after setting said following channel while converting the EPG information of a next following channel of said following channel in the order of the previously stored channels into corresponding audio data stored in said memory, the EPG information being retrieved from said memory.

3. An apparatus as defined in claim 2, wherein when there is another request for changing to said previous channel, said digital multimedia broadcast processor also delivers the EPG audio data of said previous channel to said headset after setting said previous channel while converting the EPG information of the next previous channel of said previous channel in the order of the previously stored channels into corresponding audio data stored in said memory, the EPG information being retrieved from said memory.

4. An apparatus as defined in claim 1, wherein when the user requests the EPG information of the channel presently set, said digital multimedia broadcast processor converts the EPG information retrieved from said memory into corresponding audio data delivered to said headset.

5. An apparatus as defined in claim 1, wherein when the user requests the EPG information of all channels, said digital multimedia broadcast processor sequentially converts the EPG information of each channel corresponding to a present time retrieved from said memory into respective audio data delivered to said headset, and when one of said channels is selected during transmission of its EPG information, said digital multimedia broadcast processor sets said one channel as the receiving channel.

6. An apparatus as defined in claim 1, wherein when a voice communication call is received during digital multimedia broadcast, said digital multimedia broadcast processor converts at least one of a caller's phone number and name into corresponding audio data delivered to said headset along with a confirming message asking the user to decide whether to communicate with the caller.

7. An apparatus as defined in claim 1, wherein said digital multimedia broadcast processor is connected with said headset through a wireless Local Area Network (LAN) communication.

8. A method for providing Electronic Program Guide (EPG) information in a digital multimedia broadcast receiving terminal, comprising the steps of:
   causing the digital multimedia broadcast receiving terminal to convert only EPG information of a broadcast channel, a previous channel, and a following channel, previously stored into corresponding audio data, to deliver audio data of the broadcast channel to a headset communicating with the digital multimedia broadcast receiving terminal; terminal, and to store audio data of the previous and following channels for delivery to the headset when the previous or the following channel is set as a new broadcast channel; and
   causing the headset to output the received audio data;
   wherein the previous and the following channels are determined with respect to the broadcast channel in an order of channels previously stored.

9. A method as defined in claim 8, wherein causing said digital multimedia broadcast receiving terminal to convert the EPG information further comprises:
   setting said following channel on request while delivering its EPG audio data previously stored to said headset; and
   converting the EPG information of a next following channel of said following channel into corresponding stored EPG audio data.

10. A method as defined in claim 9, wherein causing said digital multimedia broadcast receiving terminal to convert the EPG information further comprises:
    setting said previous channel on request while delivering its EPG audio data previously stored to said headset; and
    converting the EPG information of the next previous channel of said previous channel into corresponding EPG audio data and storing the corresponding EPG audio data.

11. A method as defined in claim 8, wherein causing said digital multimedia broadcast receiving terminal to convert the EPG information occurs by converting the EPG information of the channel presently set into corresponding EPG audio information delivered to said headset upon the user's request.

12. A method as defined in claim 8, wherein causing said digital multimedia broadcast receiving terminal to convert the EPG information further comprises:
    sequentially converting the EPG information of each channel corresponding to a present time into respective audio data delivered to said headset if the user requests the EPG information of all channels; and setting one of the channels as the receiving channel when that channel is selected during transmission of its EPG information.

13. A method as defined in claim 8, wherein causing said digital multimedia broadcast receiving terminal to convert the EPG information further includes converting at least one of a phone number and a name of a person who calls the user during digital multimedia broadcast into corresponding audio data delivered to said headset along with a confirming message asking the user to decide whether to communicate with the calling person.

14. A method as defined in claim 8, wherein said digital multimedia broadcast receiving terminal delivers the EPG audio data through a wireless Local Area Network (LAN) communications to said headset.

15. An apparatus for providing Electronic Program Guide (EPG) information in a digital multimedia broadcast receiving terminal, comprising:

a memory for storing the EPG information of a broadcast channel received from a digital multimedia broadcast system;

a Text to Speech (TTS) module for converting input data into corresponding output audio data; and a digital multimedia broadcast processor for causing said TTS module to convert the select EPG information retrieved from the memory into corresponding EPG audio data and to deliver the corresponding EPG audio data to a headset communicating with the digital multimedia broadcast receiving terminal;

wherein the digital multimedia broadcast processor causes the TTS module to convert only EPG information of a newly set digital multimedia broadcast channel, a previous channel and a following channel retrieved from the memory into corresponding EPG audio data to deliver EPG audio data of the newly set digital multimedia broadcast channel to the headset, and EPG audio data of the previous and following channels in the memory for delivery to the headset when the previous or the following channel is the newly set broadcast channel, and wherein the previous and the following channels are determined with respect to the new channel in an order of previously stored channels, wherein when a user requests EPG information of all channels, the digital multimedia broadcast processor causes the TTS module to sequentially convert EPG information of each channel corresponding to a present time retrieved from the memory into respective audio data sequentially delivered to the headset, and when one of the channels is selected during transmission of its EPG information, the digital multimedia broadcast processor sets the one channel as the receiving channel; and wherein the digital multimedia broadcast processor causes the TTS module to convert EPG information of a next channel into corresponding EPG audio data while delivering EPG audio data of channel converted just before the next channel to the headset, thus providing the EPG information of all the channels converted into the respective EPG audio data in real time.

16. An apparatus as defined in claim 15, wherein when there is a request for changing to said following channel, said digital multimedia broadcast processor delivers the EPG audio data of said following channel to said headset after setting said following channel while causing said TTS module to convert the EPG information of a next following channel of said following channel in the order of the previously stored channels into corresponding audio data stored in said memory, the EPG information being retrieved from said memory.

17. An apparatus as defined in claim 16, wherein when there is another request for changing to said previous channel, said digital multimedia broadcast processor also delivers the EPG audio data of said previous channel to said headset after setting said previous channel while causing said TTS module to convert the EPG information of the next previous channel of said previous channel in the order of the previously stored channels into corresponding audio data stored in said memory, the EPG information being retrieved from said memory.

18. An apparatus as defined in claim 15, wherein when the user requests the EPG information of the channel presently set, said digital multimedia broadcast processor causes said TTS module to convert the EPG information retrieved from said memory into corresponding audio data delivered to said headset.

19. An apparatus as defined in claim 15, wherein when there is received a voice communication call during digital multimedia broadcast, said digital multimedia broadcast processor causes said TTS module to convert at least one of a caller's phone number and name into corresponding audio data delivered to said headset along with a confirming message asking the user to decide whether to communicate with the caller.

* * * * *